United States Patent
Novin et al.

(10) Patent No.: US 6,871,384 B2
(45) Date of Patent: Mar. 29, 2005

(54) HINGE ASSEMBLY FOR ROTATABLY MOUNTING A DISPLAY TO A SURFACE

(75) Inventors: Eugene Novin, Ambler, PA (US); David A. Lowry, Wayne, PA (US)

(73) Assignee: CEMA Technologies, Inc., Audubon, PA (US)

( * ) Notice: Subject to any disclaimer, the term of this patent is extended or adjusted under 35 U.S.C. 154(b) by 0 days.

(21) Appl. No.: 10/143,402

(22) Filed: May 10, 2002

(65) Prior Publication Data

US 2002/0167789 A1 Nov. 14, 2002

Related U.S. Application Data

(60) Provisional application No. 60/290,381, filed on May 11, 2001.

(51) Int. Cl.[7] .............................................. E05C 17/64
(52) U.S. Cl. ......................................... 16/337; 16/342
(58) Field of Search .......................... 16/337, 309, 313, 16/342, 319, 321, 325, 335, 341

(56) References Cited

U.S. PATENT DOCUMENTS

| | | | |
|---|---|---|---|
| 2,304,223 A | * | 12/1942 | Westrope ...................... 403/52 |
| 5,022,778 A | * | 6/1991 | Lu .............................. 403/120 |
| 5,041,818 A | | 8/1991 | Liu |
| 5,052,078 A | * | 10/1991 | Hosoi ........................... 16/297 |
| 5,109,572 A | | 5/1992 | Park |
| 5,195,213 A | | 3/1993 | Ohgami et al. |
| 5,406,678 A | * | 4/1995 | Kaden et al. .................. 16/342 |
| 5,500,982 A | | 3/1996 | Hosoi |
| 5,566,048 A | | 10/1996 | Esterberg et al. |
| 5,636,102 A | | 6/1997 | Fujino et al. |
| 5,666,694 A | | 9/1997 | Slow et al. |
| 5,682,645 A | | 11/1997 | Watabe et al. |
| 5,702,197 A | | 12/1997 | Chen |
| 5,771,152 A | | 6/1998 | Crompton et al. |
| 5,946,055 A | | 8/1999 | Rosen |
| 6,035,491 A | | 3/2000 | Hartigan et al. |
| 6,119,310 A | * | 9/2000 | Ohshima et al. .............. 16/342 |
| 6,412,848 B1 | * | 7/2002 | Ceccanese et al. ......... 296/37.7 |
| 6,470,532 B2 | * | 10/2002 | Rude ........................... 16/335 |

FOREIGN PATENT DOCUMENTS

JP   6-152159   10/1992

\* cited by examiner

*Primary Examiner*—Anthony Knight
*Assistant Examiner*—Mark Williams
(74) *Attorney, Agent, or Firm*—Akin Gump Strauss Hauer & Feld, LLP

(57) ABSTRACT

The present invention relates to an assembly for rotatably mounting a display unit to a surface for movement between a first angular position adjacent the surface, a second angular position spaced from the surface and a range of third angular positions spaced from the second angular position. A first pintle secured to a first hinge mount is rotatably connected to a first hinge bracket. A first friction element secured to the first hinge bracket imparts a first resistive friction to the first pintle. A first detent mechanism secured to the first hinge bracket releasably secures the first pintle in the second angular position and imparts a second resistive friction to the first pintle when the first pintle is rotated through the range of third angular positions. The display unit rotates in a controlled manner from the first angular position to the second angular position due to a gravitational force.

16 Claims, 9 Drawing Sheets

HINGE ASSEMBLY FOR ROTATABLY MOUNTING A DISPLAY TO A SURFACE

CROSS-REFERENCE TO RELATED APPLICATIONS

This application is related to Provisional Application No. 60/290,381 filed May 11, 2001 and claims the earlier filing date of the provisional application under 35 U.S.C. 119(e).

BACKGROUND OF THE INVENTION

The present invention is directed towards a hinge assembly for rotatably mounting a display unit to a surface, and more particularly, to the interior facing side of the roof of a vehicle. Even more particularly, the present invention relates to a hinge assembly for the controlled rotation of a liquid crystal display monitor releasably secured to the roof of a vehicle from a first angular position adjacent to the roof to a second angular position spaced from the roof and thereafter, for the additional rotation of the monitor to any desired positioning within a range of third angular positions, all spaced from the roof.

The efficient utilization of limited space in the interior of a vehicle is highly desirable. The recent availability and acceptance of video systems for in-vehicle use has placed an additional requirement on the competition for the limited space. A monitor that can be variably positioned for optimal viewing when in use and unobtrusively stored when not in use provides the designer of vehicle interiors with enhanced flexibility in designing the interior layout of vehicles having a video system.

One approach to providing in-vehicle video capability while still conserving interior vehicle space is to releasably secure the monitor to the roof of the vehicle. Such an approach generally requires a hinge that allows the rotation of the monitor from a closed or storage position adjacent to the roof to an open position spaced from the roof for use. The hinge should include a friction mechanism that provides sufficient restraint of unwanted movement of the monitor while still allowing the monitor to be easily positioned for optimal viewing.

In addition to video systems for in vehicle use, another common application for such a hinge is in the computer display field. Conventional pivotable computer displays are found in laptop, notebook and palm computers. It is often necessary to control the angular position of a first member such as a laptop screen, which is rotatably coupled to a second member such as a base by a hinge.

Known hinges use a torsion spring, wrap spring, coil spring or similar device to impart a resistive friction to a shaft of the hinge that is greater when the shaft is rotated in one direction than when the shaft is rotated in the opposite direction. Such a hinge is used in a laptop computer, for example, to provide a greater closing force than an opening force so that the laptop screen cannot be slammed close and thus be damaged.

Accordingly, a hinge assembly that provides for controlled rotation and angular positioning of a first member which is rotatably coupled to a second member by a hinge is highly desirable.

BRIEF SUMMARY OF THE INVENTION

One aspect of the present invention is an assembly for rotatably mounting a display unit to a surface for movement between a first angular position adjacent the surface, a second angular position spaced from the surface and a range of third angular positions spaced from the second angular position. The display unit has a display backing panel for supporting the display unit. The assembly has a first hinge bracket for being connected to the surface and a first hinge mount for being connected to the display backing panel for rotation therewith. A first pintle is secured to the first hinge mount for rotation therewith and is rotatably connected to the first hinge bracket. A first friction element is secured to the first hinge bracket and is rotatably engaged with the first pintle. The first friction element imparts a first resistive friction to the first pintle when the first pintle is rotated. A first detent mechanism is secured to the first hinge bracket and is rotatably engaged with the first pintle. The first detent mechanism releasably secures the first pintle in the second angular position and imparts a second resistive friction to the first pintle when the first pintle is rotated through the range of third angular positions. The display unit rotates in a controlled manner from the first angular position to the second angular position due to a gravitational force.

Another aspect of the invention is an assembly for rotatably mounting a display unit to a surface for movement between a first angular position adjacent the surface, a second angular position spaced from the surface and a range of third angular positions spaced from the second angular position. The display unit has a display backing panel for supporting the display unit. The assembly has a first hinge bracket for being connected to the surface. The first hinge bracket has a first arm, a second arm spaced apart from the first arm and a first stop. The assembly additionally has a first hinge mount for being connected to the display backing panel for rotation therewith. The first hinge mount has a first step cooperating with the first stop to limit the range of third angular positions. A first pintle is secured to the first hinge mount for rotation therewith. The first pintle is journaled within the first and second arms and has a first section extending from the first arm. The first section connects the first pintle to the first hinge mount. A first friction element is secured to the first hinge bracket for rotation therewith and is rotatably engaged with the first pintle. The first friction element imparts a first resistive friction to the first pintle when the first pintle is rotated. A first detent mechanism is provided. The detent mechanism includes a generally cylindrical-shaped first rocker secured to the first pintle for rotation therewith. The first rocker has a first circumferential surface having a first pair of generally opposing offset flats and a second pair of generally opposing offset arcuate surfaces. The detent mechanism additionally includes a generally U-shaped first detent spring secured between the first and second arms of the first hinge bracket for rotation therewith. The first detent spring has a first pair of lever arms engaging the first circumferential surface of the first rocker. The first pair of lever arms cooperate with the first pair of generally opposing offset flats to releasably secure the first pintle in the second angular position and further cooperate with the second pair of generally opposing offset arcuate surfaces to impart the second resistive friction to the first rocker when the first pintle is rotated through the range of third angular positions. The display unit rotates in a controlled manner from the first angular position to the second angular position due to a gravitational force, and thereafter, is further rotatable through the range of third angular positions in response to an applied force.

Still another aspect of the invention is a hinge assembly for rotatably coupling a first member to a second member for movement between a first angular position and a range of second angular positions. The hinge assembly includes a first hinge bracket for being connected to the second member and a first hinge mount for being connected to the first member for rotation therewith. A first pintle secured to and extending from the first hinge mount for rotation therewith is rotatably connected to the first hinge bracket. A first friction element is secured to the first hinge bracket. The first friction element rotatably engages the first pintle and imparts a first resistive friction to the first pintle when the first pintle is rotated in a first direction. The first friction element imparts a second resistive friction to the first pintle when the first pintle is rotated in a second direction. The second resistive friction is less than the first resistive friction. A first detent mechanism is secured to the first hinge bracket and rotatably engages the first pintle. The first detent mechanism releasably secures the first pintle in the first angular position and imparts a third resistive friction to the first pintle when the first pintle is rotated through the range of second angular positions.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings.

DETAILED DESCRIPTION OF THE INVENTION

Figure 1:
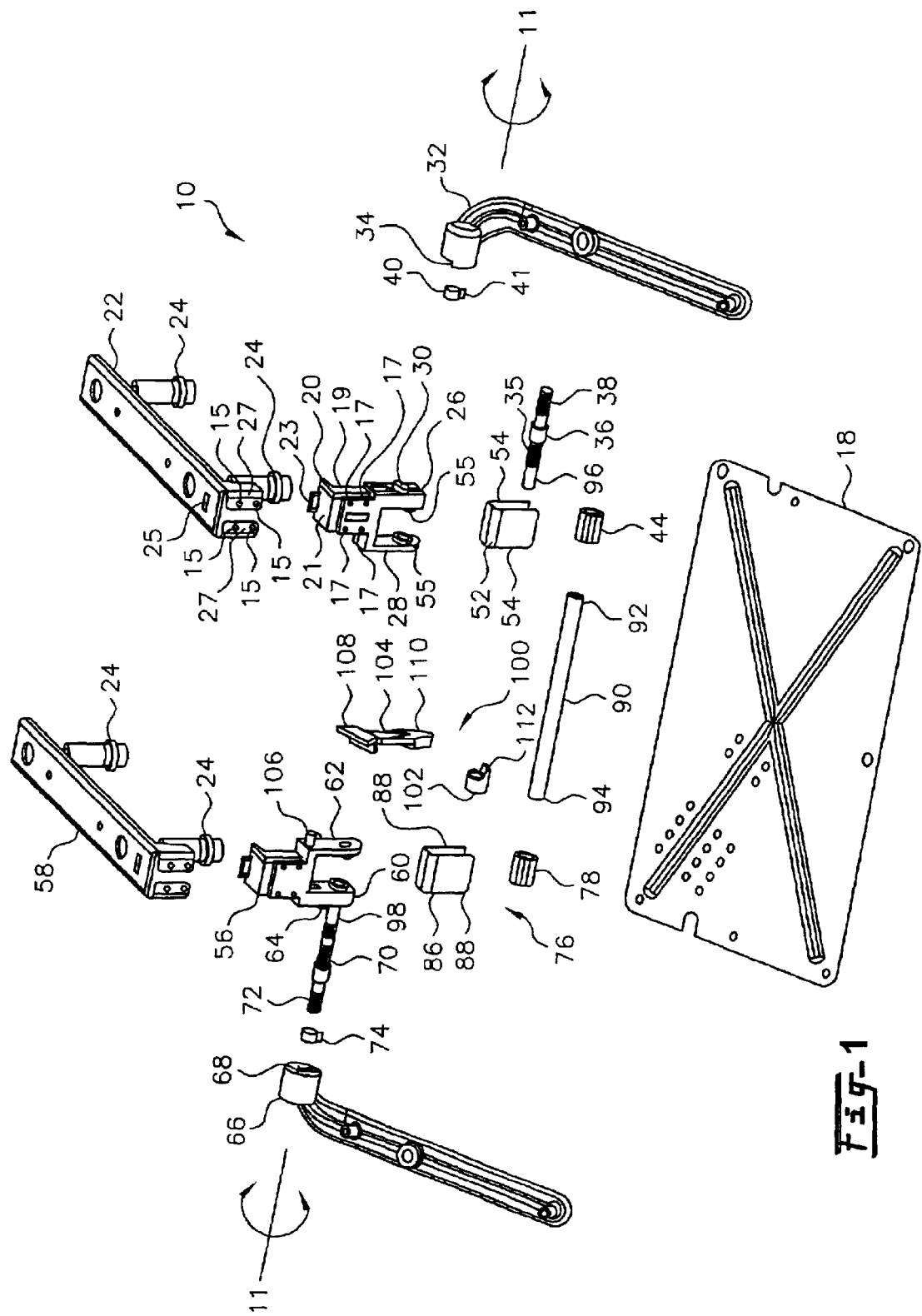
FIG. 1 is an exploded, perspective view of a hinge assembly in accordance with a first preferred embodiment of the present invention.

Certain terminology is used in the following description for convenience only and is not limiting. The words "right," "left", "lower" and "upper" designate directions in the drawings to which reference is made. The words "inwardly" and "outwardly" refer to directions toward and away from, respectively, the geometric center of the hinge assembly and designated parts thereof. The words "positive angular rotation" designate a rotation that increases the included angle between the display unit (or first member) and the roof of the vehicle (or second member), the included angle being zero when the display unit is in a first angular position adjacent to the roof. The words "negative angular rotation" designate a rotation that decreases the included angle between the display unit (or first member) and the roof of the vehicle (or second member). The terminology includes the words above specifically mentioned, derivatives thereof and words of similar import.

The present invention is directed to a hinge assembly for rotatably mounting a display unit to a surface. The surface can be any surface having a generally horizontal orientation, such as the interior facing surface of the roof of a vehicle, the underside of a shelf in a bookcase or a kitchen cabinet, a generally horizontally extending portion of a wall or the like. For the purpose of disclosing a detailed description of the invention, the interior facing surface of the roof of a vehicle will be used as representative of the surfaces to which the invention pertains. However, those having ordinary skill in the art will understand from this disclosure that the present invention is not limited to the mounting of a display unit to the roof of a vehicle and that the hinge assembly of the present invention is suitable for mounting a display unit to any surface having a generally horizontal orientation. Even more broadly, an artisan will understand that the hinge assembly of the present invention is suitable for rotatably coupling a first member to a second member for relative angular movement therebetween.

Figure 2:
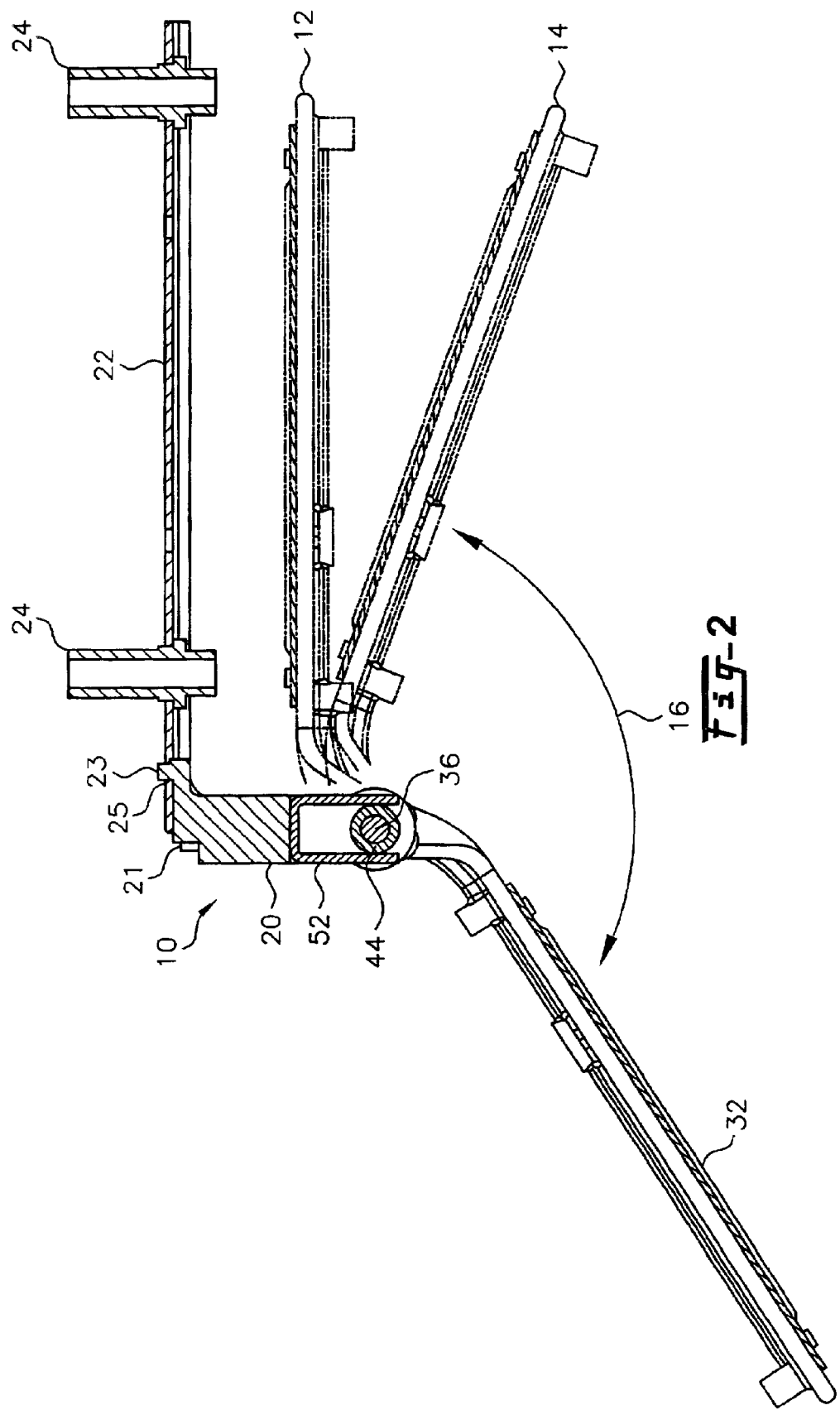
FIG. 2 is a side elevation view, partially in cross section, of the hinge assembly of FIG. 1.
Figure 3:
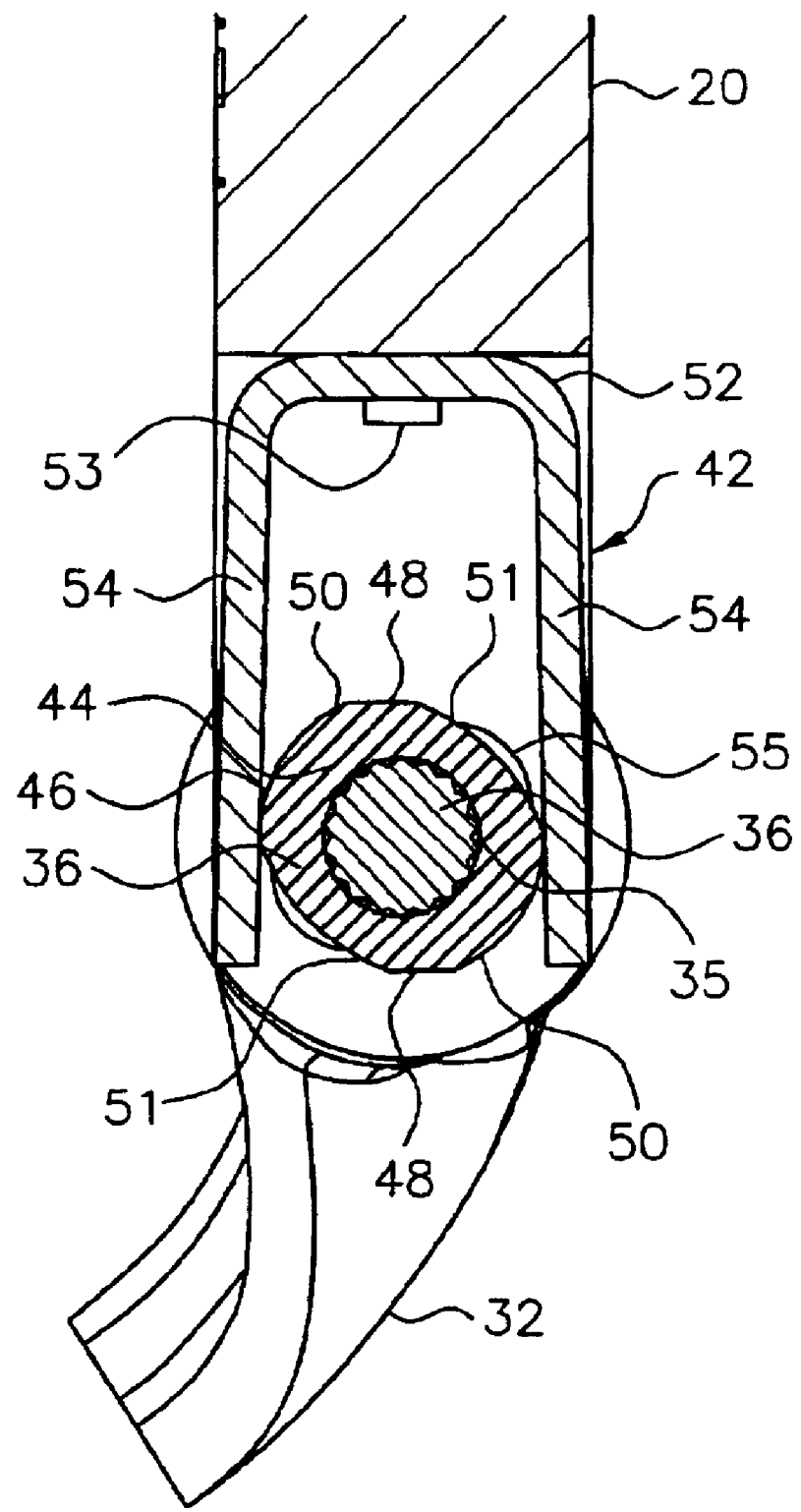
FIG. 3 is an enlarged view of a portion of the hinge assembly of FIG. 2.

Referring to the drawings in detail, where like numerals indicate like elements throughout, there is shown in FIGS. 1–3 a first preferred embodiment of a hinge assembly for an in-vehicle video system according to the present invention. More specifically, referring to FIG. 2, the first preferred embodiment is directed to a hinge assembly, generally designated 10 (hereinafter the "hinge assembly") for rotatably mounting a display unit (not shown) having a display backing panel 18 in an interior of a vehicle having a roof (not shown). The hinge assembly 10 provides for movement of the display unit about an axis of rotation 11 between a first angular position 12 adjacent the roof, a second angular position 14 spaced from the roof and a range of third angular positions 16 spaced from the second angular position 14. The second angular position 14 preferably is spaced an angular displacement of approximately twenty degrees from the first angular position 12 and the maximum range of the third angular positions 16 is preferably approximately one-hundred fifty degrees from the first angular position 12. Those having ordinary skill in the hinge art will understand from the present disclosure that the second angular position 14 could be greater or less than twenty degrees without departing from the spirit and scope of the present invention. Similarly, the range of third angular positions could be greater or less than one-hundred fifty degrees.

Referring to FIGS. 1 and 2, the hinge assembly 10 has a first hinge bracket 20 for connecting the hinge assembly 10 to the roof. In a preferred embodiment, the first hinge bracket 20 preferably is die cast from a material such as zinc and preferably has an upper body 19 having a generally rectangular cross sectional shape. The upper body 19 has holes 17 extending therethrough for receiving threaded fasteners (not shown) and an upper surface 21 with a rib 23 projecting upwardly therefrom. The rib 23 is insertable in a slot 25 in a first roof mount 22 that is preferably attachable to the roof by bushing spacers 24 having a bore therethrough for receiving a threaded fastener (not shown) for securing the bushing spacer 24 to the roof. The first roof mount 22 is a generally elongated member, preferably fabricated from sheet metal, and has a pair of opposed, spaced apart, downwardly extending flanges 27 having holes 15 corresponding to the holes 17 in the upper body 19 of the first hinge bracket 20. The first hinge bracket 20 is removably securable to the first roof mount 22 by threaded fasteners (not shown) insertable in the holes 15, 17 in the first roof mount 22 and the first hinge bracket 20, respectively.

The first hinge bracket 20 additionally has a first arm 26, a second arm 28 spaced apart from the first arm 28 and a first stop 30 projecting from the first arm 28. The first stop 30 is generally arcuate in shape and has a radially downwardly extending surface (not shown) parallel to the axis of rotation 11 of the hinge assembly 10. Those having ordinary skill in the hinge art will understand from the present disclosure that the first roof mount 22 is not required to connect the first hinge bracket 20 to the roof and that there are numerous well known devices by which the first hinge bracket 20 could be connected to the roof, including the use of a variety of fasteners to directly attach the first hinge bracket 20 to the roof.

In the first preferred embodiment, the hinge assembly 10 has a first hinge mount 32, preferably an aluminum die cast structure, for being connected by screw type fasteners (not shown) to the display backing panel 18 for rotation therewith. Preferably, the hinge assembly 10 further includes a latch (not shown) for being connected to the roof and for being operatively engagable with the display backing panel 18 for releasably securing the display unit in the first angular position 12.

The first hinge mount 32 has a first step 34 projecting therefrom. The first step 34 is generally arcuate in shape and has a radially downwardly extending surface (not shown) parallel to the axis of rotation 11 of the hinge assembly 10. The included angle between the radially downwardly extending surfaces of the first stop 30 and the first step 34 approaches zero when the angular displacement of the first hinge mount 32 approaches the limit the range of third angular positions 16. Upon contact between the first stop 30 and the first step 34, the limit of the range of third angular positions 16 has been reached and further rotation is prevented. Those having ordinary skill in the hinge art will understand from the present disclosure that the first step 34 and the first stop 30 are not required and that the range of third angular positions 16 could extend until the roof prevents further rotation.

A first pintle 36, preferably constructed from steel, is secured to the first hinge mount 32 for rotation therewith, is rotatably connected to the first hinge bracket 20 and has an axis of rotation that is coincident with the axis of rotation 11 of the hinge assembly 10. In the first preferred embodiment, the first pintle 36 is journaled for rotation within the first and second arms 26, 28 of the first hinge bracket 20. Additionally, the first pintle 36 has a first section 38 that extends beyond the first arm 26. The first section 38 has a splined surface and is secured to the first hinge mount 32 by an interference fit in which the first section 38 of the first pintle 36 is inserted into a correspondingly splined bore in the first hinge mount 32.

A first friction element 40, preferably constructed from steel and preferably generally shaped in the form of a question mark in cross section, is secured by a knuckle 41 to the first hinge bracket 20 and rotatably engaged with the first pintle 36. The first friction element 40 has an internal surface defining a generally cylindrical cavity. The diameter of the internal surface of the first friction element 40 is smaller than or equal to the diameter of the external surface of the first pintle 36. The first friction element 40 receives the first pintle 36 within the cylindrical cavity with an interference fit, frictionally engages the external surface of the first pintle 36 and imparts a first resistive friction to the first pintle 36 when the first pintle 36 is rotated.

In the first preferred embodiment, the first friction element 40 imparts the first resistive friction to the first pintle 36 when the first pintle 36 is rotated in a first direction and imparts a third resistive friction to the first pintle 36 when the first pintle 36 is rotated in a second direction. A rotation in the first direction is a positive angular rotation that corresponds to a rotation of the display unit from the first angular position 12 in which the display unit is releasably secured to the roof toward the second angular position 14. A rotation in the second direction is a negative angular rotation and is opposite to the first direction. The difference in the magnitude of the first and third resistive frictions arises due to a change in contact stresses between the internal surface of the first friction element 40 and the external surface of the first pintle 36. The change in contact stresses is caused by a change in bending moment applied to the first friction element 40 and occurs when the direction of rotation changes.

The first resistive friction preferably has a magnitude that allows the display unit to freely fall in a controlled manner solely due to the weight of the display unit and gravity from the first angular position 12 to the second angular position 14 upon release of the latch securing the display unit in the first angular position 12. The magnitude of the third resistive force preferably is greater than the magnitude of the first resistive force.

Those having ordinary skill in the hinge art will understand from the present disclosure that the magnitude of the first resistive force could be greater or less than the magnitude required to permit a controlled free fall of the display unit without departing from the spirit and scope of the present invention. Similarly, the artisan will also understand that the third resistive force could be greater or less than the magnitude of the first resistive force.

Referring to FIG. 3, a first detent mechanism 42 is secured to the first hinge bracket 20 and is rotatably engaged with the first pintle 36. In the preferred embodiment, the first detent mechanism 42 includes a generally cylindrical-shaped first rocker 44, preferably fabricated from a polymeric material, corresponding in length to the space between the first and second arms 26, 28 of the first hinge bracket 20. The first rocker 44 has a splined bore therethrough and is secured by an interference fit to a correspondingly splined circumferential surface 35 of the first pintle 36 for rotation therewith.

The first rocker 44 has a first or outer circumferential surface 46 having a first pair of generally opposing offset flats 48 that lie in spaced apart planes parallel to each other and to the axis of rotation 11, a second pair of generally opposing offset arcuate surfaces 50 having a first radius and a fifth pair of generally arcuate surfaces 51 spaced from the axis of rotation 11 a distance less than half the distance between the spaced apart planes in which the first pair of generally opposing offset flats 48 lie. Those having ordinary skill in the art will understand from the discussion below that the fifth pair of generally arcuate surfaces 51 could have a arbitrary shape provided that the fifth pair of generally arcuate surfaces 51 does not contact the first detent spring 52.

The first detent mechanism 42 has a generally U-shaped first detent spring 52, preferably constructed from spring steel, that is secured, preferably by a rivet 53, between the first and second arms 26, 28 of the first hinge bracket 20. The first detent spring 52 has integral thereto a first pair of lever arms 54 that are biased toward each other or inwardly biased. A first pair of bosses 55 integral to the first and second arms 26, 28 of the first hinge bracket 20 preload the first pair of lever arms 54 with an inwardly directed spring force sufficient to restrain gravity induced rotation of the display unit by outwardly spacing apart the first pair of lever arms 54 to a distance approximately equal to the distance separating the spaced apart planes in which the first pair of generally opposing offset flats 48 lie.

The first detent mechanism 42 releasably secures the first pintle 36 in the second angular position 14. In a preferred embodiment, when the first pintle 36, and thus the display unit, is in the second angular position 14, the first pair of lever arms 54 cooperates with and engages the first pair of generally opposing offset flats 48. The first pair of lever arms 54 applies to the first pair of generally opposing offset flats 48 an inwardly directed spring force sufficient to restrain gravity induced rotation of the display unit thereby releasably securing the display unit in the second position 14.

The first detent mechanism 42 additionally imparts a second resistive friction to the first pintle 36 when the first pintle 36 is rotated through the range of third angular positions 16. In the preferred embodiment, when the first pintle 36, and thus the display unit, is rotated through the range of third angular positions 16, the first pair of lever arms 54 further cooperates with and engages the second pair of opposing offset arcuate surfaces 50 of the first rocker 44. The first pair of lever arms 54 applies to the second pair of opposing offset arcuate surfaces 50 an inwardly directed spring force that imparts the second resistive friction to the first rocker 44 when the first pintle 36 is rotated through the range of third angular positions 16.

Those having ordinary skill in the art of hinge design will understand that the present invention is not limited to construction from the preferred materials disclosed above or to any particular material. For instance, all the disclosed components of the hinge assembly 10 could be constructed from aluminum or stainless steel or a zinc alloy or engineered from polymeric materials without departing from the spirit and scope of the invention.

Referring to FIG. 1, the hinge assembly 10 additionally includes a second hinge bracket 56, second pintle 70, second friction element 74 and second detent mechanism 76, all of which have substantially the same structure, in mirror image orientation, as the structure disclosed above. Accordingly, for brevity, the following disclosure incorporates therein the features of the corresponding structure disclosed above as if set forth in full.

The second hinge bracket 56 is spaced apart from the first hinge bracket 20. The second hinge bracket 56 is connected to a second roof mount 58 which is also attached to the roof by bushing spacers 24. The second hinge bracket 56 has a third arm 60, a fourth arm 62 spaced apart from the third arm 60 and a second stop 64. A second hinge mount 66 is spaced apart from and is generally parallel to the first hinge mount 32. The second hinge mount 66 is for being connected by screw type fasteners (not shown) to the display backing panel 18 for rotation therewith. The second hinge mount 66 has a second step 68 cooperating with the second stop 64 to limit the range of third angular positions 16.

A second pintle 70 is secured to the second hinge mount 66 for rotation therewith and has an axis of rotation that is coincident with the axis of rotation 11 of the hinge assembly 10. The second pintle 70 is journaled within the third and fourth arms 60, 62 of the second hinge bracket 56 and has a third section 72 extending from the third arm 60 of the second hinge bracket 56. The third section 72 of the second pintle 70 connects the second pintle 70 to the second hinge mount 66.

A second friction element 74 is secured to the second hinge bracket 56 for rotation therewith and is rotatably engaged with the second pintle 70. The second friction element 74 imparts a fourth resistive friction, preferably having approximately the same magnitude as the first resistive friction, to the second pintle 70 when the second pintle 70 is rotated in the first direction and imparts a fifth resistive friction, preferably having approximately the same magnitude as the third resistive friction, to the second pintle 70 when the second pintle 70 is rotated in the second direction.

A second detent mechanism 76 also is provided. The second detent mechanism 76 has a generally cylindrical-shaped second rocker 78 secured to the second pintle 70 for rotation therewith. The second rocker 78 is substantially the same as the first rocker 44 and has a second or outer circumferential surface having a third pair of generally opposing offset flats, a fourth pair of generally opposing offset arcuate surfaces, and a sixth pair of generally opposing offset arcuate surfaces corresponding to the first pair of generally opposing offset flats 48, the second pair of generally opposing offset arcuate surfaces 50, and the fifth pair of generally opposing offset arcuate surfaces 51 of the first rocker 44, respectively. The first or outer circumferential surface 46 of the first rocker 44 and the second or outer circumferential surface of the second rocker 78 are aligned on the first pintle 36 and the second pintle 70, respectively, to act in unison. A generally U-shaped second detent spring 86, substantially the same as the first detent spring 52, is secured between the third and fourth arms 60, 62 of the second hinge bracket 56 for rotation therewith.

The second detent spring 86 has a second pair of lever arms 88 that engages the second circumferential surface of the second rocker 78. The second pair of lever arms 88 cooperates with the third pair of generally opposing offset flats to releasably secure the second pintle 70 in the second angular position 14. The second pair of lever arms 88 further cooperates with the fourth pair of generally opposing offset arcuate surfaces to impart the sixth resistive friction, preferably having approximately the same magnitude as the second resistive friction, to the second rocker 78 when the second pintle 70 is rotated through the range of third angular positions 16.

A spacer 90 having the general shape of a tube with a generally annular cross section is provided. The spacer has a first end 92 for receiving the second section 96 of the first pintle 36 and a second end 94 for receiving a portion of the fourth section 98 of the second pintle 70. The spacer 90 is positioned between the second arm 28 of the first hinge bracket 20 and the fourth arm 62 of the second hinge bracket 56. The first end 92 of the spacer 90 is connected by an interference fit to a second section 96 of the first pintle 36. The second section 96 extends from the second arm 28 of the first hinge bracket 20. The second end 94 of the spacer 90 is connected by an interference fit to a fourth section 98 of the second pintle 70. The fourth section 98 of the second pintle 70 extends from the fourth arm 62 of the second hinge bracket 56.

The hinge assembly 10 further includes an optical switch actuator assembly 100 for turning the display unit on and off. The optical switch actuator assembly 100 includes a rocker cam 102 with a splined bore for receiving a portion of the fourth section 98 of the second pintle 70 having an outer circumferential surface with splines corresponding to the splines in the bore of the rocker cam 102. The rocker cam 102 is secured by an interference fit to the splined portion of the fourth section 98 of the second pintle 70 for rotation therewith. The optical switch actuator assembly 100 also includes a spring biased vane 104 keyed to a pivot pin 106 extending from the fourth arm 62 of the second hinge bracket 56. The vane 104 has a lower portion 110 in follower contact with a boss 112 protruding from the rocker cam 102 and an upper arcuate portion 108 for interfering with a light beam (not shown), the obstruction of which causes an electronic circuit (not shown) to turn off the display unit. The vane 104 is aligned on the pivot pin 106 such that the light beam is obstructed and the display unit is off when the display unit is in the first position 12 and the light beam is unobstructed and the display unit is on when the display unit is rotated from the first position 12. Those skilled in the art will understand from the present disclosure that there are numerous well known devices for turning the display unit on and off based upon the angular position of the display, including rotary mechanical switches, and that the use of an optical switch assembly is not limiting.

In use, the hinge assembly 10 is installed in the interior of a vehicle by securing the first and second hinge brackets 20, 56 to the first and second roof mounts 22, 58 which have been previously attached to the roof by bushing spacers 24. This is accomplished by inserting the rib 23 of the first hinge bracket 20 in to the slot 25 in the first roof mount 22 and then inserting threaded fasteners into the holes 15, 17 in the first roof mount 22 and the first hinge bracket 20, respectively. The second hinge bracket 56 is similarly secured to the second roof mount 58. Next, the display backing panel 18 supporting the display unit is secured to the first and second hinge mounts 32, 66 by threaded fasteners. Finally, the display unit is releasable secured in the first angular position 12 to the roof by operatively engaging the latch with the display backing panel 18.

To activate and view the display, a user of the display disengages the latch releasing the display unit. Under the force of gravity opposed by the combined first and fourth resistive frictions imparted to the first and second pintles 36, 70 by the first and second friction elements 40, 74, the display unit rotates in the positive direction in a controlled manner approximately twenty degrees from the first angular position 12 to the second angular position 14. As the display unit rotates, the rocker cam 102 secured to the fourth section 98 of the second pintle 70 rotates the vane 104 out of the path of the light beam, thereby activating the electrical circuitry that turns the display unit on. When the display unit rotates to the second angular position 14, the display unit is releasable secured in the second angular position 14 by the first and second detent mechanisms 42, 76.

The occupant of the vehicle may position the display unit for optimal viewing within the range of third angular positions 16 by grasping and further rotating the display unit through a positive angular rotation, thereby increasing the included angle between the display unit and the roof. This is achieved by applying to the display unit a force necessary to overcome the combined first and fourth resistive frictions imparted by the first and second friction elements 40, 74 and the second and sixth resistive frictions imparted by the first and second detent mechanisms 42, 76 to the first and second pintles 36, 70. The occupant is prevented from rotating the display unit beyond the range of permissible third angular positions 16 by the first and second stops 30, 64 and first and second steps 34, 68.

When the occupant has finished viewing the display unit, by a negative angular rotation, the display unit may be returned to the second angular position 14 and then to the first angular position 12. This is achieved by first applying to the display unit the force necessary to overcome the combined third and fifth resistive frictions imparted by the first and second friction elements 40, 74 and the second and sixth resistive frictions imparted by the first and second detent mechanisms 42, 76 to the first and second pintles 36, 70 and then the force necessary to overcome only the third and fifth resistive frictions. Upon reaching the first angular position 12, the optical switch assembly 100 turns the display unit off and the display unit is securable to the roof by the releasable latch.

Referring to FIGS. 4–10, there is shown a second preferred embodiment of a hinge assembly according to the present invention. More specifically, referring to FIG. 4, there is shown a second preferred embodiment of a hinge assembly, generally designated 210 (hereinafter the "latchless hinge assembly"), for rotatably coupling a first member (not shown) to a second member (not shown). The latchless hinge assembly 210 provides for movement of the first member about an axis of rotation 211 between a first angular position 212 relative to the second member and a range of second angular positions 214 spaced from the first angular position 214. Preferably, the first member is a display unit and the second member is a generally horizontal surface. However, those having ordinary skill in the art will understand from this disclosure that the first and second members can be any couplable structures between which relative rotational movement is desired. Preferably, in the first angular position 212, the first member is adjacent to and spaced from the second member. The range of second angular positions 214 is preferably approximately one hundred thirty-five degrees from the first angular position 212. Those having ordinary skill in the art will understand from this disclosure that the first angular position 212 could be an arbitrary angular displacement from the second member and that the range of second angular positions 214 could be greater or less than one hundred thirty-five degrees without departing from the spirit and scope of the present invention.

Generally, the materials from which the components of the latchless hinge assembly 210 are formed are substantially the same as the materials discussed above for the hinge assembly 10 and, for brevity, will not be further discussed.

Referring to FIGS. 4–6 and 8–9, the latchless hinge assembly 210 has a first hinge bracket 220 for connecting the latchless hinge assembly 210 to the second member. In the preferred embodiment, the first hinge bracket 220 is generally L-shaped and has an upper body 219 that is integral with and generally perpendicular to a lower body 221. The upper body 219 has a generally rectangular cross-sectional shape. Holes 217 extend through the upper body 219 and are for receiving threaded fasteners (not shown) for removably securing the first hinge bracket 220 to the second member. The lower body 221 has a first rib 222 and a second rib 223 spaced from the first rib 222.

The latchless hinge assembly 210 also has a first hinge mount 232 for connecting the latchless hinge assembly 210 to the first member. In the preferred embodiment, the first hinge mount 232 has a backing panel 218 integral thereto for being connected by screw type fasteners (not shown) to the first member.

A first pintle 236 is secured to the first hinge mount 232 for rotation therewith, is rotatably connected to the first hinge bracket 220 and has an axis of rotation that is coincident with the axis of rotation 211 of the latchless hinge assembly 210. In the preferred embodiment, the first pintle 236 is journaled for rotation within the lower body 221 of the first hinge bracket 220. Additionally, the first pintle 236 has a first section 238 that extends beyond the second rib 223 of the lower body 221 of the first hinge bracket 220. The first section 238 has a splined surface and is secured to the first hinge mount 232 by an interference fit in which the first section 238 of the first pintle 236 is inserted into a correspondingly splined bore in the first hinge mount 232.

A first friction element 240 is secured to the first hinge bracket 220 and rotatably engaged with a center section 237 of the first pintle 236. The first friction element 240 preferably is generally shaped in the form of a question mark in cross section. Those having ordinary skill in the art will understand from the present disclosure that the first friction element 240 may have other forms including an open friction collar or wrap spring that substantially circumferentially surrounds a portion of a length of the first pintle 236 and that the first friction element 240 may be integral with the first hinge bracket 220 without departing from the spirit and scope of the present invention.

The first friction element 240 preferably is disposed in a bore 224 in the lower body 221 of the first hinge bracket 220 and is secured to the first hinge bracket 220 by a knuckle 241 that extends from the friction element 240 into a channel 225 in the bore 240. The first friction element 240 has an internal surface defining a generally cylindrical cavity. The diameter of the internal surface of the first friction element 240 is smaller than or equal to the diameter of the external surface of the center section 237 of the first pintle 236. The first friction element 240 receives the first pintle 236 within the cylindrical cavity with an interference fit, frictionally engages the external surface of the first pintle 236 and imparts a first resistive friction to the first pintle 236 when the first pintle 236 is rotated.

In the first preferred embodiment, the first friction element 240 imparts the first resistive friction to the first pintle 236 when the first pintle 236 is rotated through a positive angular rotation and imparts a second resistive friction to the first pintle 236 when the first pintle 236 is rotated through a negative angular rotation. The difference in the magnitude of the first and second resistive frictions arises due to a change in contact stresses between the internal surface of the first friction element 240 and the external surface of the first pintle 236. The change in contact stresses is caused by a change in bending moment applied to the first friction element 240 and occurs when the direction of rotation changes. The magnitude of the second resistive force preferably is greater than the magnitude of the first resistive force. However, those having ordinary skill in the hinge art will understand from the present disclosure that the magnitude of the first resistive force could be greater or less than the magnitude of the second resistive force without departing from the spirit and scope of the present invention.

Referring to FIGS. 4–6 and 8, a first detent mechanism 242 is secured to the first hinge bracket 220 and is rotatably engaged with the first pintle 236. In the preferred embodiment, the first detent mechanism 242 includes a generally cylindrical-shaped first rocker 244 corresponding in length to the distance between the first and second ribs 222, 223 of the first hinge bracket 220. The first rocker 244 has a splined bore therethrough and is secured by an interference fit to a correspondingly splined circumferential surface 235 of the second section 239 first pintle 236 for rotation therewith.

The first rocker 244 has a first or outer circumferential surface 246 having a first pair of generally opposing offset flats 248 that lie in spaced apart planes parallel to each other and to the axis of rotation 211 and a first pair of generally opposing arcuate surfaces 250. Preferably, the first pair of offset flats 248 and the first pair of arcuate surfaces 250 extend the entire length of the first rocker 244. However, those of ordinary skill in the art will understand from the present disclosure that the first pair of offset flats 248 and the first pair of arcuate surfaces 250 extend over only a portion of the first rocker 244 without departing from the spirit and scope of the present invention.

The first detent mechanism 242 preferably has a generally U-shaped first detent spring 252 that is secured to the first rib 222 of the first hinge bracket 220 by a peg 251 having a hole 253 through which a stud 255 projecting from the first rib is inserted. The first detent spring 252 has integral thereto a first pair of lever arms 254 that are biased toward each other or inwardly biased.

The first detent mechanism 242 releasably secures the first pintle 236 in the first angular position 212. In the preferred embodiment, when the first pintle 236, and thus the first member, is in the first angular position 212, the first pair of lever arms 254 cooperates with and engages the first pair of generally opposing offset flats 248. The first pair of lever arms 254 applies to the first pair of generally opposing offset flats 248 an inwardly directed spring force sufficient to restrain rotation of the first member thereby releasably securing the first member in the first angular position 212.

The first detent mechanism 242 additionally imparts a third resistive friction to the first pintle 236 when the first pintle 236 is rotated through the range of second angular positions 214. Preferably, when the first pintle 236, and thus the first member, is rotated through the range of second angular positions 214, the first pair of lever arms 254 further cooperates with and engages the first pair of opposing offset arcuate surfaces 250 of the first rocker 244. The first pair of lever arms 254 applies to the first pair of opposing offset arcuate surfaces 250 an inwardly directed spring force that imparts the third resistive friction to the first rocker 244 when the first pintle 236 is rotated through the range of second angular positions 214.

Figure 5:
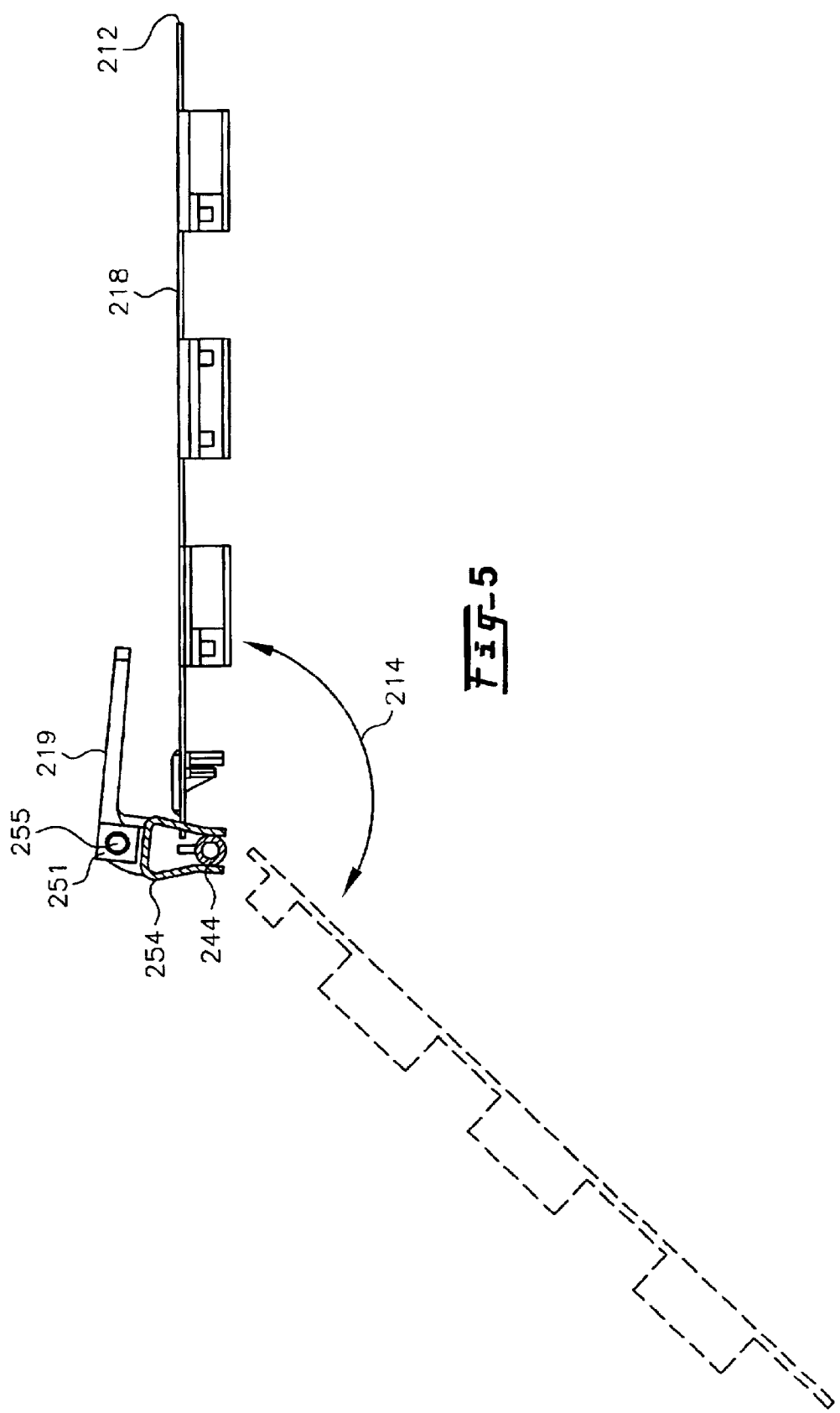
FIG. 5 is a side elevation view, partially in cross section, of the hinge assembly of FIG. 4.
Figure 6:
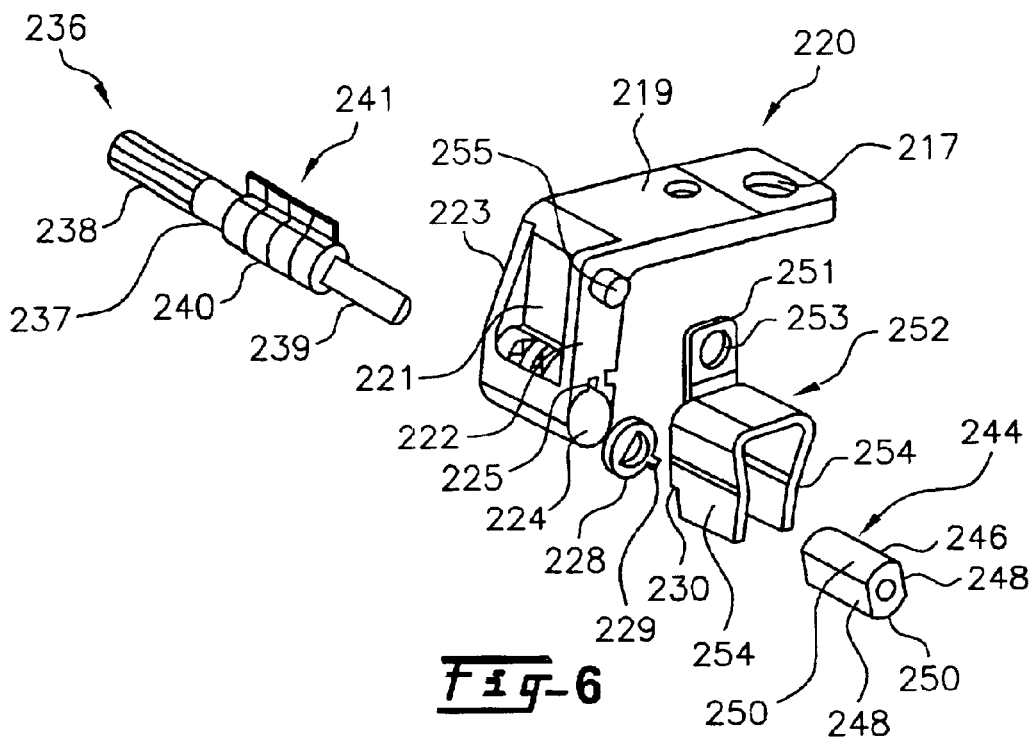
FIG. 6 is an enlarged, exploded perspective view of the first hinge bracket of the hinge assembly of FIG. 4.

Referring to FIGS. 5 and 6, the extent of the range of second angular positions of the first member about the axis of rotation 211 is limited, preferably to approximately one hundred thirty-five degrees, by a step 230 that prevents further rotation of a stopper 228 secured to the first pintle 236. In the preferred embodiment, the step 230 is formed by a cutout in the edge of one arm of the pair of lever arms 254 of the first detent spring 252. The stopper 228 preferably is an annular ring with a generally D-shaped bore and is secured by an interference fit to a correspondingly D-shaped circumferential surface of a portion of the first pintle 236 between the center section 236 and second section 239 of the first pintle 236. The stopper 228 has a radially outwardly projecting tongue 229 positioned for contact with the step 230 when the first member approaches the limit of the range of second angular positions 214.

Figure 4:
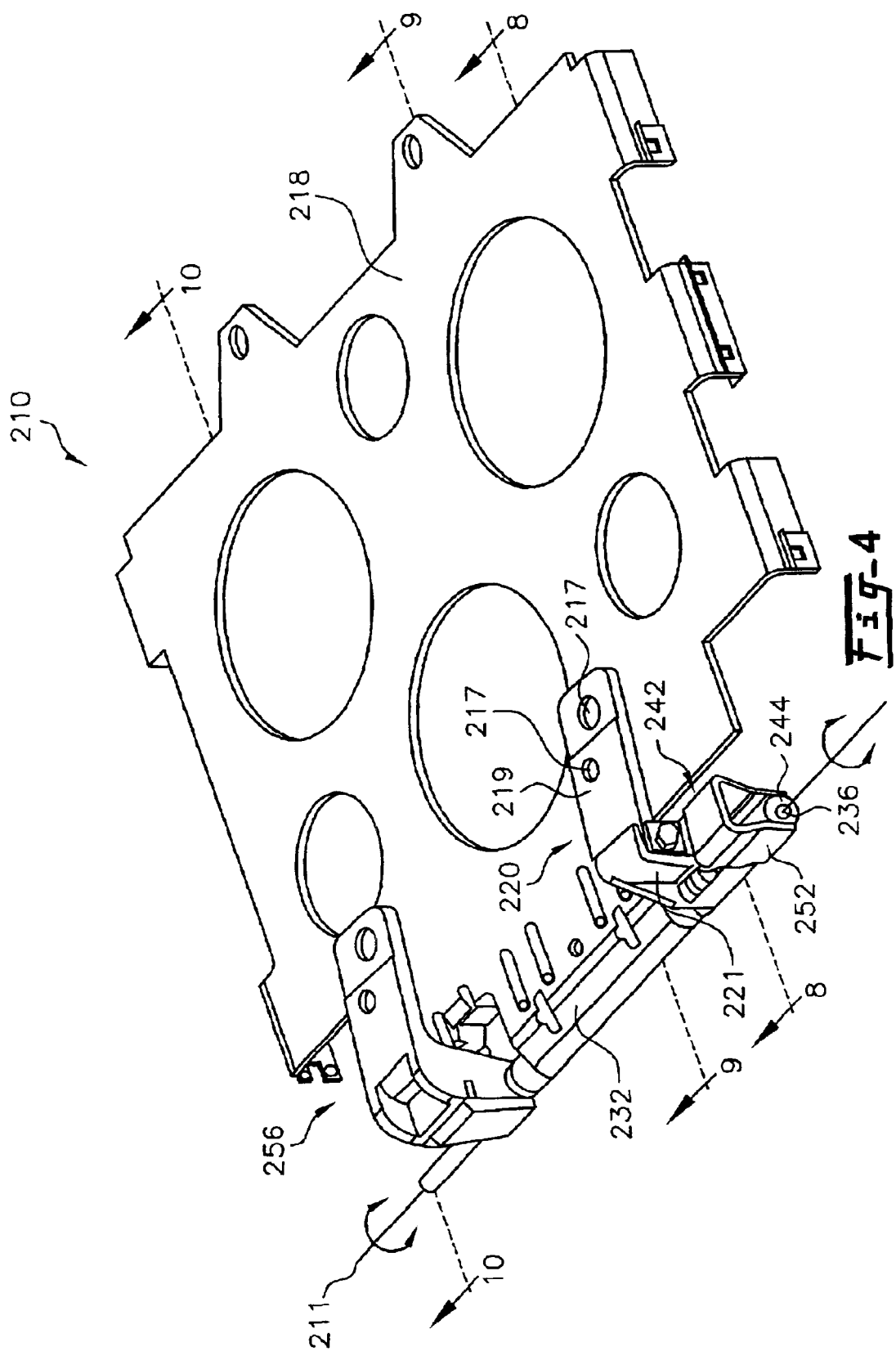
FIG. 4 is a top, perspective view of a hinge assembly in accordance with a second preferred embodiment of the present invention.
Figure 7:
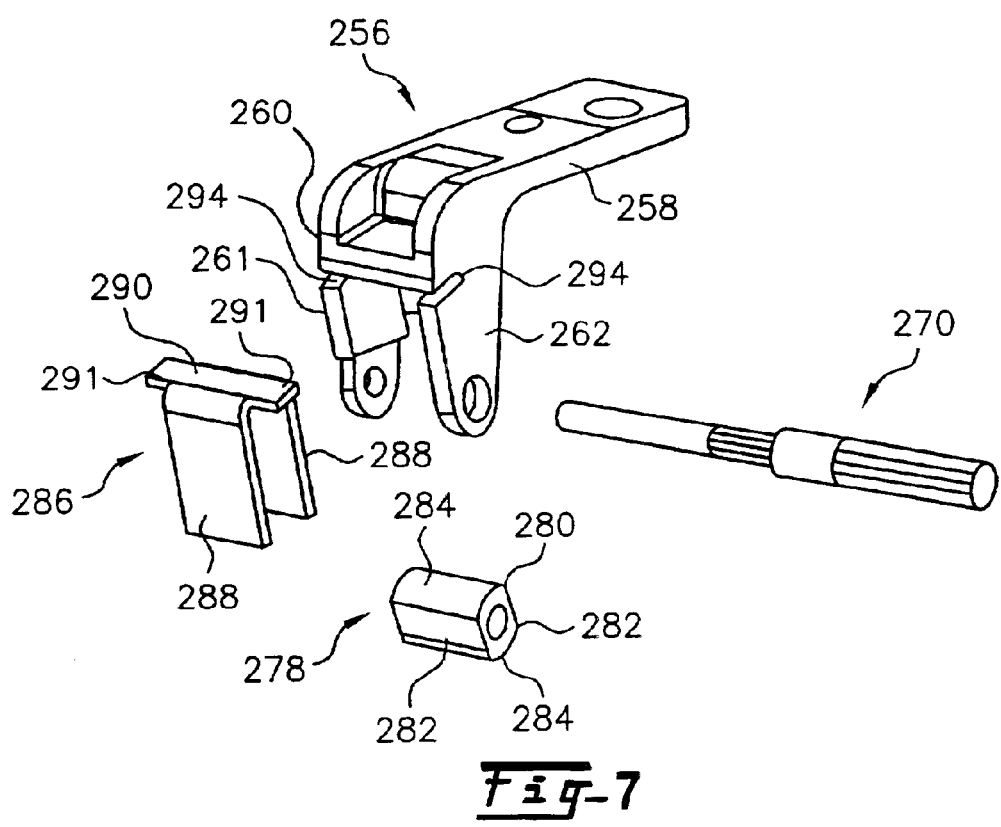
FIG. 7 is an enlarged, exploded perspective view of the second hinge bracket of the hinge assembly of FIG. 4.
Figure 8:
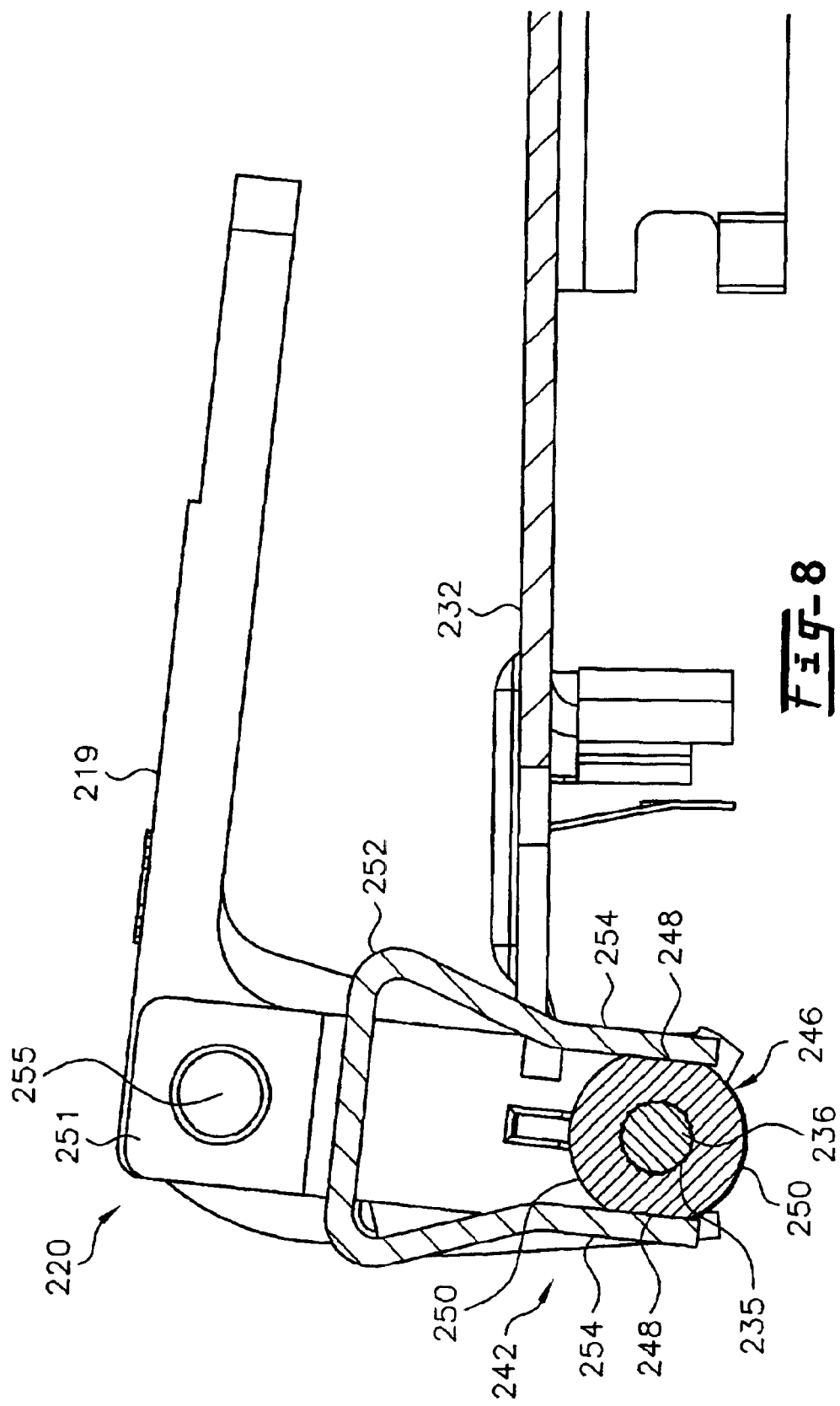
FIG. 8 is an enlarged cross-sectional view of a portion of the hinge assembly along the line 8—8 of FIG. 4.
Figure 9:
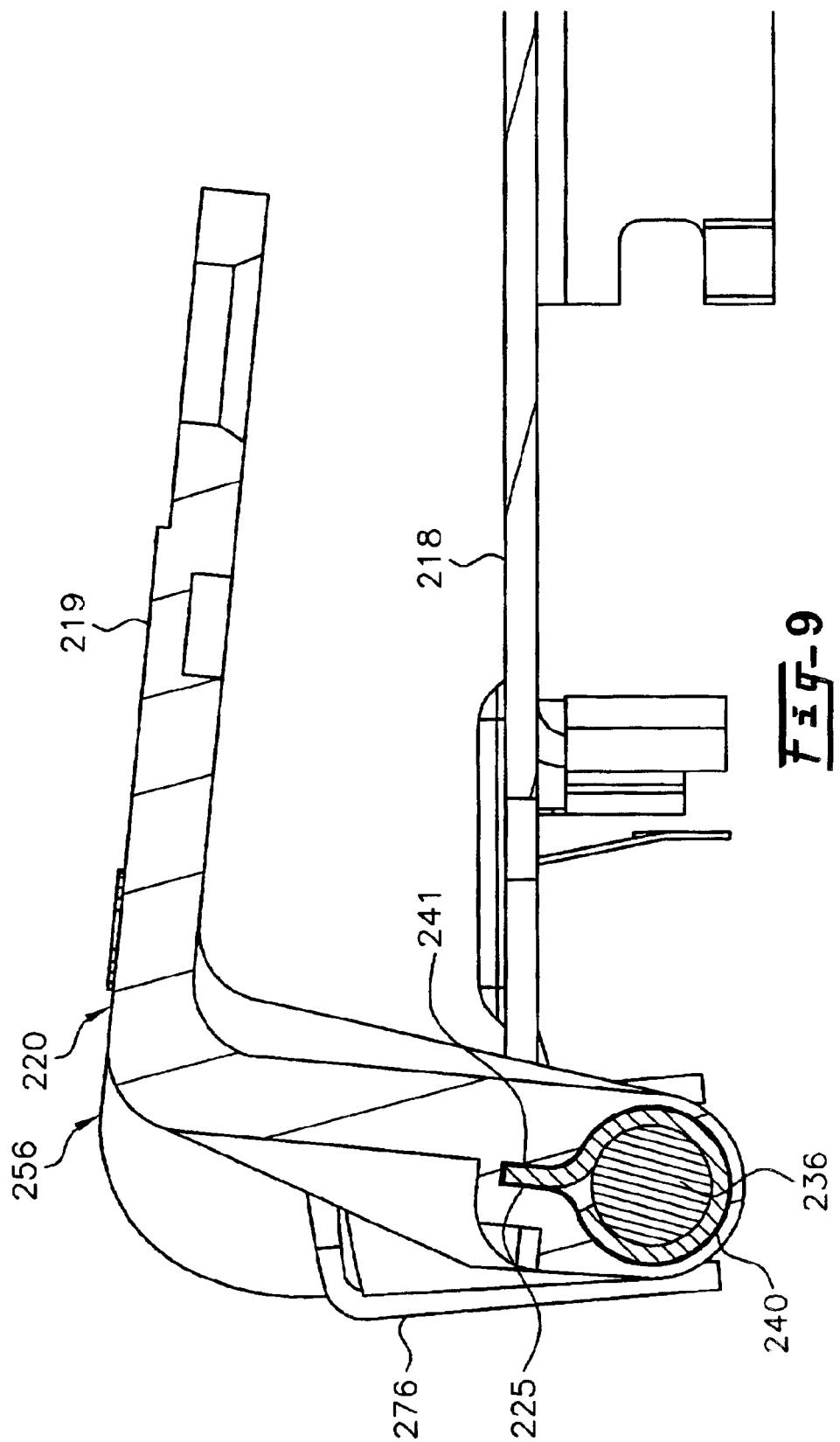
FIG. 9 is an enlarged cross-sectional view of a portion of the hinge assembly along the line 9—9 of FIG. 4.
Figure 10:
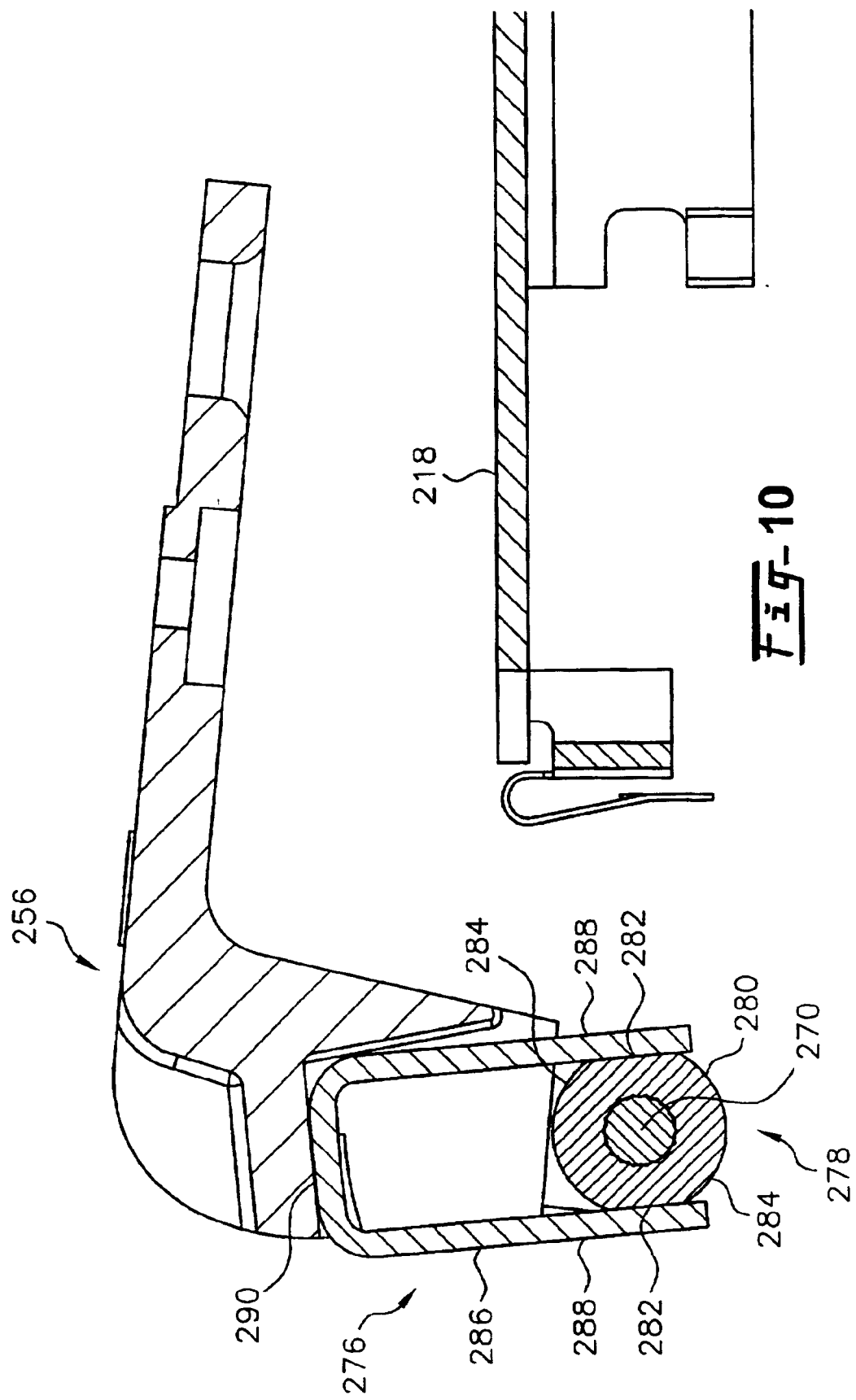
FIG. 10 is an enlarged cross-sectional view of a portion of the hinge assembly along the line 10—10 of FIG. 4.

Referring to FIGS. 4, 7 and 10, the latchless hinge assembly 210 additionally includes a second detent mechanism 276 secured to a second hinge bracket 256. The second detent mechanism 276 rotatably engages a second pintle 270 secured to and extending from the first hinge mount 232. The second pintle 270 has an axis of rotation that is coincident with the axis of rotation 211 of the hinge mount 210. Those having ordinary skill in the art will understand from this disclosure that the second pintle 270 may be integral with and an extension of the first pintle 236 without departing from the spirit and scope of the present invention. The second detent mechanism releasably secures the second pintle 270 in the first angular position and imparts a fourth resistive friction to the second pintle 270 when the second pintle 270 is rotated through the second range of angular positions 214.

The second hinge bracket 256 has an upper body 258 that is substantially similar to the upper body 219 of the first hinge bracket 220. The lower body 260 has a first arm 261 and a second arm 262 spaced from the first arm 261. The second pintle 270 is journaled for rotation within the first and second arms 261, 262.

In the preferred embodiment, a generally cylindrical-shaped second rocker 278, substantially the same as the first rocker 244 discussed above, is located between the first and second arms 261, 262 of the lower body 260 of the second hinge bracket 256 and is secured to the second pintle 270 for rotation therewith. The second rocker 278 includes a second circumferential surface 280 having a second pair of generally opposing flats 282 and a second pair of generally opposing arcuate surfaces 284.

The second detent mechanism 276 preferably has a generally U-shaped second detent spring 286 substantially the same as the first detent spring 252 discussed above. The second detent spring 286 has a second pair of lever arms 288 that is integral with and spaced apart by an upper member 290. The second pair of lever arms 288 is biased toward each other or inwardly biased. The upper member 290 of the second detent mechanism 276 has extending from opposed sides thereof a pair of tabs 291 that are received with an interference fit within a pair of slots 294 in the first and second arms 261, 262 of the lower body 260 of the second hinge bracket 256 to secure the second detent spring 286 to the second hinge bracket 256.

The second pair of lever arms 288 engages the second circumferential surface 280 of the second rocker 278. More specifically, in the preferred embodiment, the second pair of lever arms 288 cooperate with the second pair of generally opposing offset flats 282 to releasably secure the second pintle 270 in the first angular position 212 and further cooperate with the second pair of opposing arcuate surfaces 284 to impart the fourth resistive friction to the second rocker 278 when the second pintle 270 is rotated through the range of second angular positions 214.

The latchless hinge assembly 210 is used in a manner similar to the manner disclosed above for the hinge assembly 10. The salient difference is that the latchless hinge assembly 210 does not require a latch and accordingly does not provide as a feature controlled rotation under the force of gravity from a first position to a second position. More specifically, a display unit mounted to the first hinge mount 232 is releasably secured in the first position 212 adjacent to and spaced from a horizontal surface, to which the first hinge bracket 220 is attached by the spring force imparted to the first and second pintles 236, 270 by the first and second detent mechanisms 242, 276. The display unit will remain in the first position until a force necessary to overcome the spring force is applied. Subsequent application of a first force necessary to overcome the combined first resistive friction of the first friction element 240 and the third and fourth resistive frictions of the first and second detent mechanisms 242, 276 rotates the display unit through a positive angular displacement within the range of second angular positions 214. Rotation beyond the range of permissible second angular positions 214 is prevented by the stopper 228 and the step 230. Application of a second force necessary to overcome the combined second resistive friction of the first friction element 240 and the third and fourth resistive frictions of the first and second detent mechanisms 242, 276 rotates the display unit through a negative angular displacement until the display unit is returned to the first angular position 212 and releasable secured in that position by the spring force applied by the first and second detent mechanisms 242, 276.

Those skilled in the art will appreciate that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An assembly for rotatably mounting a display unit to a surface for movement between a first angular position adjacent the surface, a second angular position spaced from the surface and a range of third annular positions spaced from the second annular position, the display unit having a display backing panel for supporting the display unit, the assembly comprising:

a first hinge bracket for being connected to the surface;

a first hinge mount for being connected to the display backing panel for rotation therewith;

a first pintle secured to the first hinge mount for rotation therewith, the first pintle being rotatably connected to the first hinge bracket;

a first friction element secured to the first hinge bracket, the first friction element rotatably engaging the first pintle and imparting a first resistive friction to the first pintle when the first pintle is rotated; and a first detent mechanism secured to the first hinge bracket and rotatably engaging the first pintle, the first detent mechanism releasably securing the first pintle in the second annular position and imparting a second resistive friction to the first pintle when the first pintle is rotated through the range of third angular positions, whereby the display unit rotates in a controlled manner from the first angular position to the second angular position due to a gravitational force, wherein the first detent mechanism comprises:

a generally cylindrical-shaped first rocker secured to the first pintle for rotation therewith, the first rocker including a first circumferential surface having a first pair of generally opposing offset flats and a second pair of opposing offset arcuate surfaces; and a generally U-shaped first detent spring secured to the first hinge bracket, the first detent spring having a first pair of lever arms engaging the first circumferential surface of the first rocker, the first pair of lever arms cooperating with the first pair of generally opposing offset flats to releasably secure the first pintle in the second angular position and further cooperating with the second pair of opposing offset arcuate surfaces to impart the second resistive friction to the first rocker when the first pintle is rotated through the range of third angular positions.

2. An assembly for rotatably mounting a display unit to a surface for movement between a first angular position adjacent the surface, a second angular position spaced from the surface and a range of third angular positions spaced from the second angular position, the display unit having a display backing panel for supporting the display unit, the assembly comprising:

a first hinge bracket for being connected to the surface, the first hinge bracket having a first arm and a second arm spaced apart from the first arm;

a first hinge mount for being connected to the display backing panel for rotation therewith;

a first pintle secured to the first hinge mount for rotation therewith, the first pintle being rotatably connected to the first hinge bracket, journaled within the first and second arms and having a first section that extends from the first arm, the first section connecting the first pintle to the first hinge mount;

a first friction element secured to the first hinge bracket, the first friction element rotatably engaging the first pintle and imparting a first resistive friction to the first pintle when the first pintle is rotated; and a first detent mechanism secured to the first hinge bracket, positioned between the first and second arms, and rotatably engaging the first pintle, the first detent mechanism releasably securing the first pintle in the second angular position and imparting a second resistive friction to the first pintle when the first pintle is rotated through the range of third angular positions, whereby the display unit rotates in a controlled manner from the first angular position to the second angular position due to a gravitational force.

3. An assembly for rotatably mounting a display unit to a surface for movement between a first angular position adjacent the surface, a second angular position spaced from the surface and a range of third angular positions spaced from the second angular position, the display unit having a display backing panel for supporting the display unit, the assembly comprising:

a first hinge bracket for being connected to the surface, the first hinge bracket having a first arm, a second arm spaced apart from the first arm and a first stop;

a first hinge mount for being connected to the display backing panel for rotation therewith, the first hinge mount including a first step cooperating with the first stop to limit the range of third angular positions;

a first pintle secured to the first hinge mount for rotation therewith, the first pintle being journaled within the first and second arms and including a first section extending from the first arm, the first section connecting the first pintle to the first hinge mount;

a first friction element secured to the first hinge bracket for rotation therewith, the first friction element rotatably engaging the first pintle and imparting a first resistive friction to the first pintle when the first pintle is rotated; and a first detent mechanism comprising:

a generally cylindrical-shaped first rocker secured to the first pintle for rotation therewith, the first rocker including a first circumferential surface having a first pair of generally opposing offset flats and a second pair of generally opposing offset arcuate surfaces; and a generally U-shaped first detent spring secured between the first and second arms of the first hinge bracket for rotation therewith, the first detent spring having a first pair of lever arms engaging the first circumferential surface of the first rocker, the first pair of lever arms cooperating with the first pair of generally opposing offset flats to releasably secure the first pintle in the second angular position and further cooperating with the second pair of generally opposing offset arcuate surfaces to impart the second resistive friction to the first rocker when the first pintle is rotated through the range of third angular positions, whereby the display unit rotates in a controlled manner from the first angular position to the second angular position due to a gravitational force, and thereafter, is further rotatable through the range of third angular positions in response to an applied force.

4. The assembly in claim 3, wherein the surface is an interior facing side of a roof of a vehicle.

5. The assembly in claim 3, wherein the first friction element imparts the first resistive friction to the first pintle when the first pintle is rotated in a first direction and imparts a third resistive friction to the first pintle when the first pintle is rotated in a second direction.

6. The assembly in claim 5, further comprising:

a second hinge bracket spaced apart from the first hinge bracket, the second hinge bracket for being connected to the surface and including a third arm, a fourth arm spaced apart from the third arm and a second stop;

a second hinge mount spaced apart from the first hinge mount, the second hinge mount for being connected to the display backing panel for rotation therewith, and including a second step cooperating with the second stop to limit the range of third angular positions;

a second pintle secured to the second hinge mount for rotation therewith, the second pintle being journaled within the third and fourth arms and including a third section extending from the third arm, the third section connecting the second pintle to the second hinge mount;

a second friction element secured to the second hinge bracket for rotation therewith, the second friction element rotatably engaging the second pintle and imparting a fourth resistive friction to the second pintle when the second pintle is rotated in the first direction and imparting a fifth resistive friction to the second pintle when the second pintle is rotated in the second direction; and a second detent mechanism comprising:

a generally cylindrical-shaped second rocker secured to the second pintle for rotation therewith, the second rocker including a second circumferential surface having a third pair of generally opposing offset flats and a fourth pair of generally opposing offset arcuate surfaces; and a generally U-shaped second detent spring secured between the third and fourth arms for rotation therewith, the second detent spring having a second pair of lever anus engaging the second circumferential surface of the second rocker, the second pair of lever arms cooperating with the third pair of generally opposing offset flats to releasably secure the second pintle in the second angular position and further cooperating with the fourth pair of generally opposing offset arcuate surfaces to impart the sixth resistive friction to the second rocker when the second pintle is rotated through the range of third angular positions;

a spacer having a first end and a second end, the spacer being positioned between the second arm of the first hinge bracket and the fourth arm of the second hinge bracket, the first end of the spacer being connected to a second section of the first pintle, the second section extending from the second arm of the first hinge bracket, the second end of the spacer being connected to a fourth section of the second pintle, the fourth section extending from the fourth arm of the second hinge bracket.

7. The assembly according to claim 6, wherein the fourth resistive friction is approximately equal to the first resistive friction, the fifth resistive friction is approximately equal to the third resistive friction and the sixth resistive friction is approximately equal to the second resistive friction.

8. The assembly according to claim 6, further comprising an optical switch actuator assembly having a cam secured to the fourth section of the second pintle for rotation therewith, the cam engaging a spring biased vane rotatably connected to the fourth arm of the second hinge bracket, the optical switch actuator assembly actuating the display unit.

9. A hinge assembly for rotatably coupling a first member to a second member for movement between a first angular position and a range of second angular positions, the hinge assembly comprising:

a first hinge bracket for being connected to the second member, a first hinge mount for being connected to the first member for rotation therewith;

a first pintle secured to and extending from the first hinge mount for rotation therewith, the first pintle being rotatably connected to the first hinge bracket;

a first friction element secured to the first hinge bracket, the first friction element rotatably engaging the first pintle and imparting a first resistive friction to the first pintle when the first pintle is rotated in a first direction and imparting a second resistive friction to the first pintle when the first pintle is rotated in a second direction, the second resistive friction being less than the first resistive friction; and a first detent mechanism secured to the first hinge bracket and rotatably engaging the first pintle, the first detent mechanism releasably securing the first pintle in the first angular position and imparting a third resistive friction to the first pintle when the first pintle is rotated through the range of second angular positions.

10. The hinge assembly of claim 9 wherein the first detent mechanism comprises:

a generally cylindrical-shaped first rocker secured to the first pintle for rotation therewith, the first rocker including a first circumferential surface having a first pair of generally opposing flats and a second pair of generally opposing arcuate surfaces; and a generally U-shaped first detent spring secured to the first hinge bracket, the first detent spring having a first pair of lever arms that engaging the first circumferential surface of the first rocker, the first pair of lever arms cooperating with the first pair of generally opposing offset flats to releasably secure the first pintle in the first angular position and further cooperating with the second pair of opposing arcuate surfaces to impart the third resistive friction to the first rocker when the first pintle is rotated through the range of second angular positions.

11. The hinge assembly of claim 10 wherein the first pair of opposing flats and the second pair of opposing arcuate surfaces extend the entire length of the first rocker.

12. The hinge assembly of claim 9 wherein the first friction element is an open friction collar that substantially circumferentially surrounds a portion of a length of the first pintle.

13. The hinge assembly of claim 9 wherein the first friction element is a wrap spring that substantially circumferentially surrounds a portion of a length of the first pintle.

14. The hinge assembly of claim 9 wherein the first friction element is integral with the hinge bracket.

15. The hinge assembly of claim 9 further comprising a second detent mechanism secured to a second hinge bracket and rotatably engaging a second pintle secured to and extending from the first hinge mount, the second detent mechanism releasably securing the second pintle in the first angular position and imparting a fourth resistive friction to the second pintle when the second pintle is rotated through the range of second angular positions.

16. The hinge assembly of claim 15 wherein the second detent mechanism comprises:

a generally cylindrical-shaped second rocker secured to the second pintle for rotation therewith, the second rocker including a second circumferential surface having a second pair of generally opposing flats and a second pair of generally opposing arcuate surfaces; and a generally U-shaped second detent spring secured to the first hinge bracket, the second detent spring having a second pair of lever arms that engaging the second circumferential surface of the second rocker, the second pair of lever arms cooperating with the second pair of generally opposing offset flats to releasably secure the second pintle in the first angular position and further cooperating with the second pair of opposing arcuate surfaces to impart the fourth resistive friction to the second rocker when the second pintle is rotated through the range of second angular positions.

* * * * *